US007669630B2

(12) United States Patent
Hui

(10) Patent No.: US 7,669,630 B2
(45) Date of Patent: Mar. 2, 2010

(54) HOLE PUNCH WITH AUTOMATIC REINFORCEMENT RING PLACEMENT

(76) Inventor: Lap Shun Hui, 14726 Ramona Ave., No. 201, Chino, CA (US) 91710

( * ) Notice: Subject to any disclaimer, the term of this patent is extended or adjusted under 35 U.S.C. 154(b) by 281 days.

(21) Appl. No.: 11/821,312

(22) Filed: Jun. 22, 2007

(65) Prior Publication Data

US 2008/0314526 A1 Dec. 25, 2008

(51) Int. Cl.

*B32B 38/04* (2006.01)
*B32B 37/18* (2006.01)
*B32B 37/12* (2006.01)
*B32B 37/16* (2006.01)

(52) U.S. Cl. ....................... 156/514; 156/513; 156/250; 156/256; 156/261; 156/556; 156/563; 156/564; 156/573

(58) Field of Classification Search ................. 156/250, 156/256, 261, 513, 514, 553, 556, 564, 573; 221/30, 151, 303, 306
See application file for complete search history.

(56) References Cited

U.S. PATENT DOCUMENTS 4,909,893 A * 3/1990 Lee ............................ 156/513
6,206,070 B1 * 3/2001 Salmon ...................... 156/513
6,789,593 B1 * 9/2004 Aono et al. ................. 156/513
7,318,465 B1 * 1/2008 Hui ............................ 156/540

* cited by examiner

*Primary Examiner*—Mark A Osele
*Assistant Examiner*—Christopher C Caillouet
(74) *Attorney, Agent, or Firm*—Leonard Tachner

(57) ABSTRACT

Hole punch apparatus which automatically places a reinforcement ring precisely around each punched hole concurrently with the creation of each hole and using the same motion that punches the holes. In a preferred embodiment, the punch shaft has a ring compression disk affixed around it at a location above the punch face. The compression disk has a ring cushion and a stack of reinforcement rings extending along the punch shaft toward the punch face, but spaced therefrom to permit the punch face to puncture a sheet before the lowermost reinforcement ring is then compressed against the sheet in precise axial alignment with the punched hole. The rings each have sufficient adhesive to adhere to the sheet, one and only one ring at each hole, while disengaging from the remaining rings in the stack. A sheet interface unit is installed on the lower surface of a punch bracket enclosure and provides a sheet retainer so that the sheet cannot rise significantly above the bracket base and thus will pull the lowermost reinforcement ring away from the stack as the punch lever is released. When re-supply is needed, a new ring stack is readily installed using a ring stack cassette, which in the preferred embodiment also replaces the sheet interface unit including the sheet retainer.

2 Claims, 8 Drawing Sheets

HOLE PUNCH WITH AUTOMATIC REINFORCEMENT RING PLACEMENT

BACKGROUND OF THE INVENTION

1. Field of the Invention

The present invention relates generally to the field of office supplies. The invention relates more specifically to hole punches with the additional feature of automatically installing a reinforcement ring around each punched hole concurrently with the creation of the hole.

2. Background Art

Mechanical hole punches have been a standard office supply accessory for many years. Handle-operated, plunger type, two and three hole punches are especially useful office implements for creating hard copy paper files using ACCO fasteners and loose-leaf notebooks. Historically, the holes made in paper or card-stock sheets have been strengthened with a thin, glue-coated reinforcement ring positioned coaxially around the punched hole perimeter. However, reinforcement rings are typically purchased separately in matchbox style packages and require intense manual effort to install. Each such reinforcement ring must first be wetted to activate the glue and then applied one by one to each previously punched hole including carefully aligning the ring hole with the punched hole before pressing the ring into contact with the sheet with sufficient care to avoid folding or otherwise distorting the ring. Those rings that are improperly placed or inadvertently distorted or misshaped, often must be removed and replaced with another ring. Thus, the application of such reinforcement rings is a highly inefficient and often messy and time-consuming process.

Therefore, there is an ongoing need for a way to obviate the conventional reinforcement ring installation process which suffers from the aforementioned deficiencies.

SUMMARY OF THE INVENTION

The present invention meets the aforementioned need by providing a uniquely configured hole punch apparatus which automatically places a reinforcement ring precisely around each punched hole concurrently with the creation of each hole and using the same motion that punches the holes. In effect, the present invention completely avoids the prior art process of glue wetting, alignment of ring hole with punch hole and manual contacting of each reinforcement ring with a punched hole. Moreover, it avoids inadvertent folding, bending or other distortion of the reinforcement ring that would otherwise require replacement of such a faulty ring with a new one.

In a preferred embodiment disclosed herein, the punch shaft has a ring compression disk affixed around it at a location above the punch face. The compression disk has a ring cushion and a stack of reinforcement rings extending along the punch shaft toward the punch face, but spaced therefrom to permit the punch face to puncture a sheet before the lowermost reinforcement ring is then compressed against the sheet in precise axial alignment with the punched hole. The rings each have sufficient adhesive to adhere to the sheet, one and only one ring at each hole, while disengaging from the remaining rings in the stack. A sheet interface unit is installed on the lower surface of a punch bracket enclosure and provides a sheet retainer slightly spaced from the hole punch bracket base to form a gap sufficient in height to insert a sheet to be punched, but sufficiently small so that the sheet cannot rise significantly above the bracket base and thus will pull the lowermost reinforcement ring away from the stack as the punch lever is released. When re-supply is needed, a new ring stack is readily installed using a ring stack cassette, which in the preferred embodiment, also replaces the sheet interface unit including the sheet retainer.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 1:
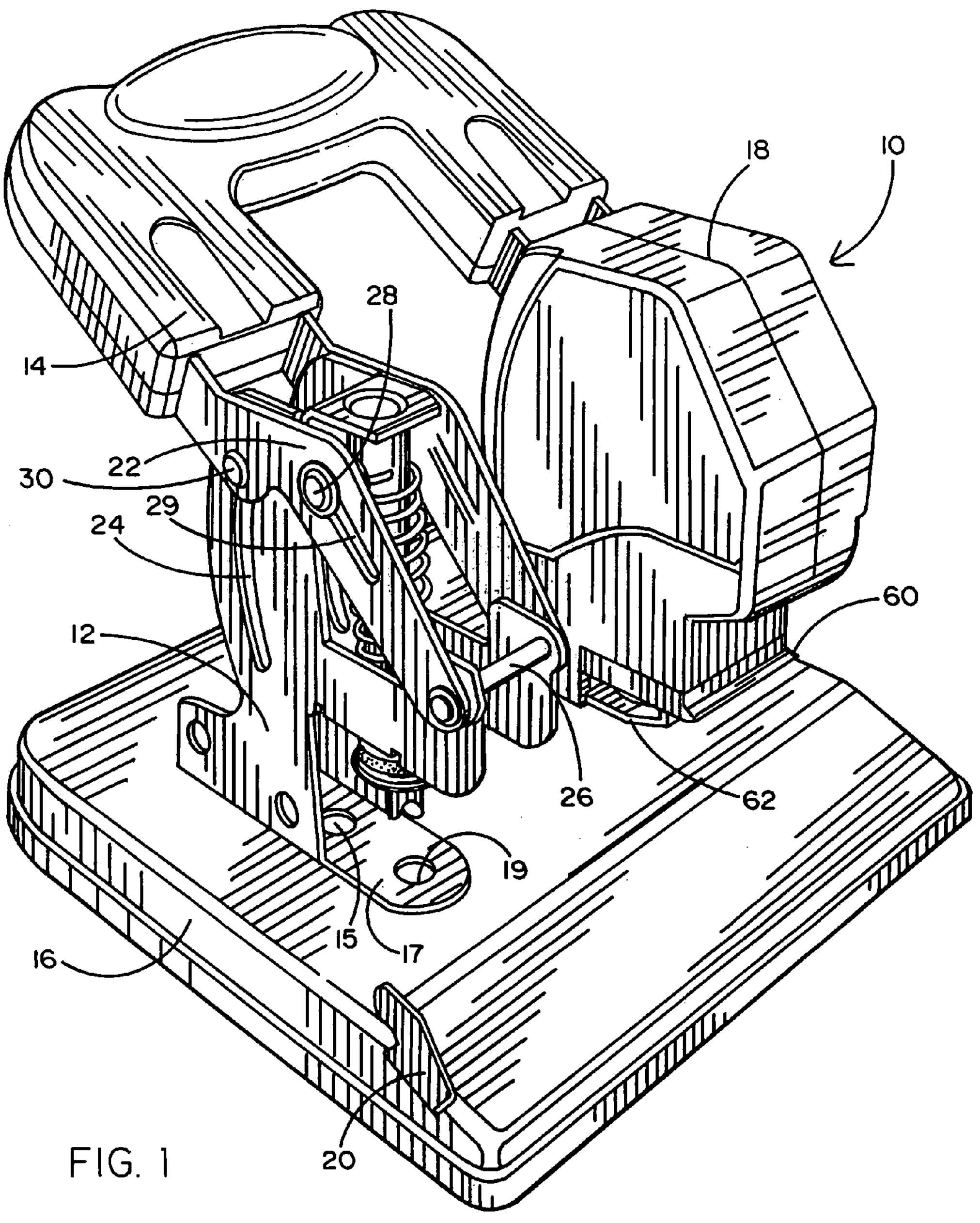
FIG. 1 is a three-dimensional view of a two-hole punch with one enclosure removed to reveal the detailed structure of the preferred embodiment.
Figure 2:
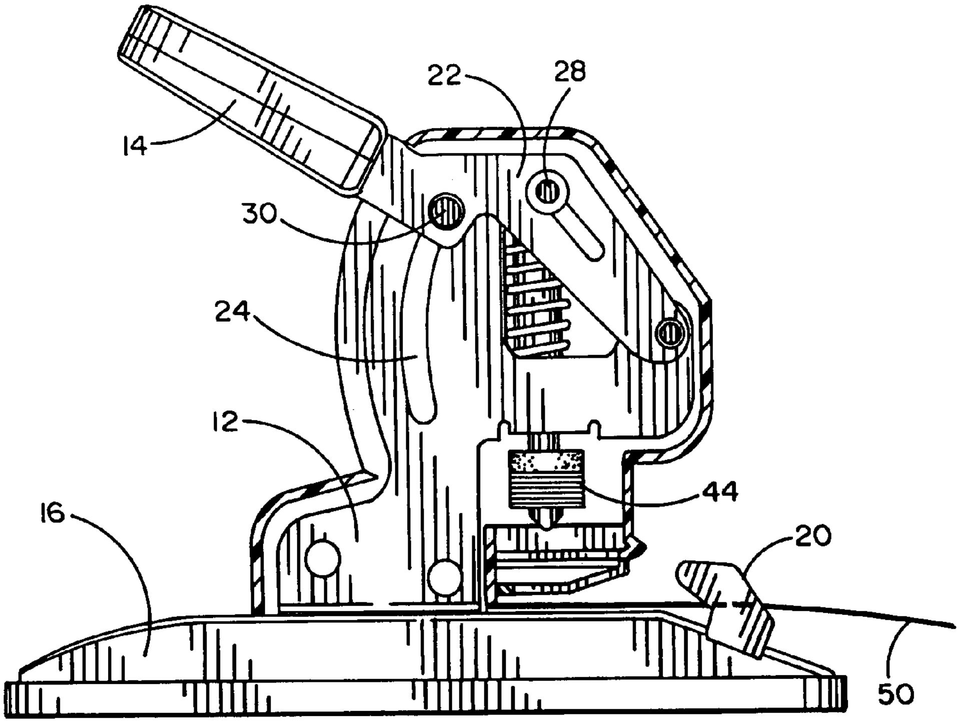
FIG. 2 is a partially cross-sectioned side view of the preferred embodiment with the punch in the inactivated, relaxed state.
Figure 3:
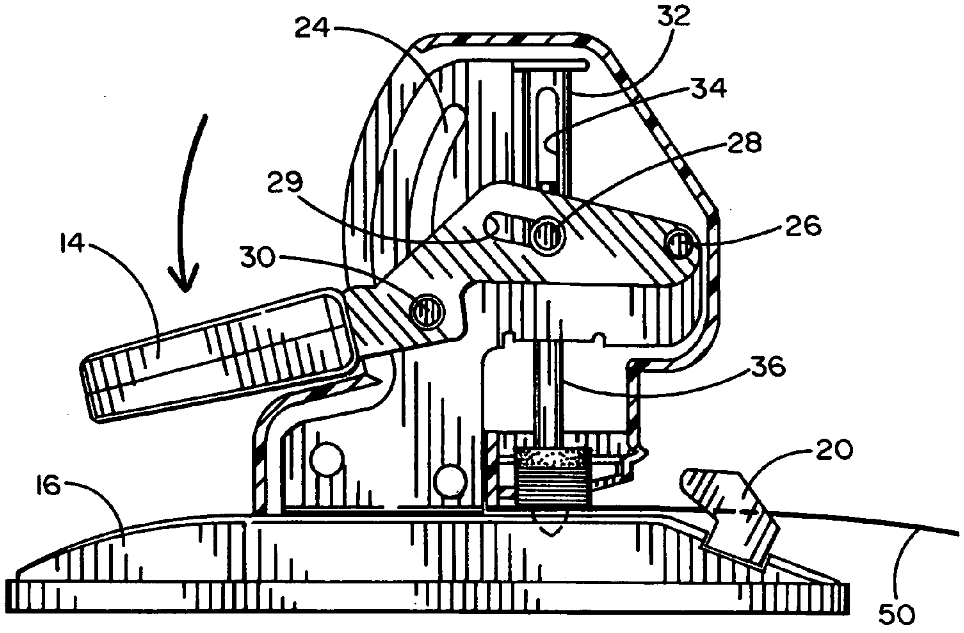
FIG. 3 is a view similar to FIG. 2, but with the punch in the fully activated state.

Referring to the accompanying drawings and initially to FIGS. 1-7 in particular, it will be seen that a two-hole punch 10 comprises a pair of support brackets 12, one covered by an enclosure 18 and one uncovered for purposes of disclosure herein. A handle 14 is connected to respective levers 22 for selectively activating the punch 10. Each bracket 12 is secured at the bracket base 17 by rivets or bolts 15 to a hollow punch base 16 which collects punch chads and can be opened to dispose of the chads. An aperture 19 in bracket base 17 allows the chads to be cut and shed into the punch base 16 as will be seen hereinafter. A sheet guide 20 is slideably installed in base 16 to precisely position a sheet to be punched.

Lever 22 is connected through a fulcrum 26 to rotate with depression of handle 14 relative to support bracket 12. A guide slot 24 and a guide pin 30 assure stable and precise rotation through a selected angle. A punch pin 28, resting in a slot 29 at its opposed ends, extends through a punch thrust slot 34 in a punch tube 32 above a punch shaft 36. A spring 35 surrounds tube 32 and is compressed by punch pin 28 while punch shaft 36 is forced to travel toward base 16. Punch shaft 36 terminates in a sharp edged punch face 38.

A ring compression disk 40 is affixed to shaft 36 above face 38 such as by a c-shaped spring-in-radial groove arrangement. A disk-shaped cushion 42 is adhered to the lower surface of the disk 40. A stack 44 of reinforcement rings 45 is positioned on shaft 36 between face 38 and cushion 44 as seen best in FIG. 4.

Figure 5:
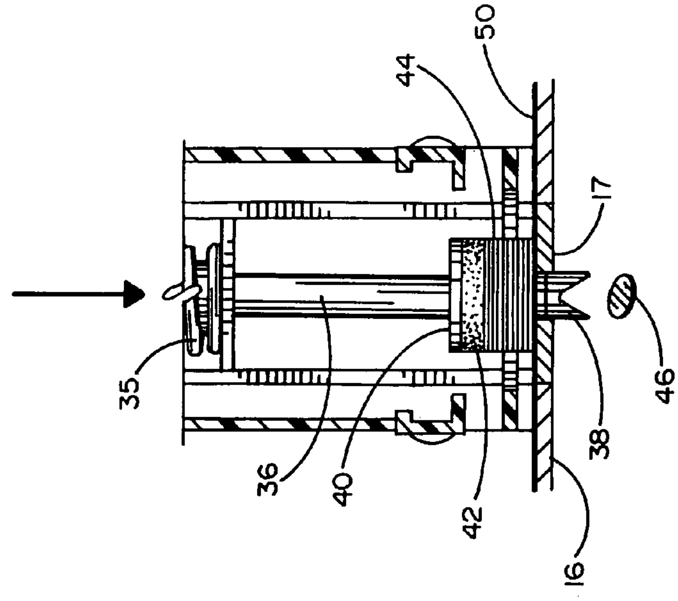
FIG. 5 is a partial front view of the punch in its fully activated state.
Figure 4:
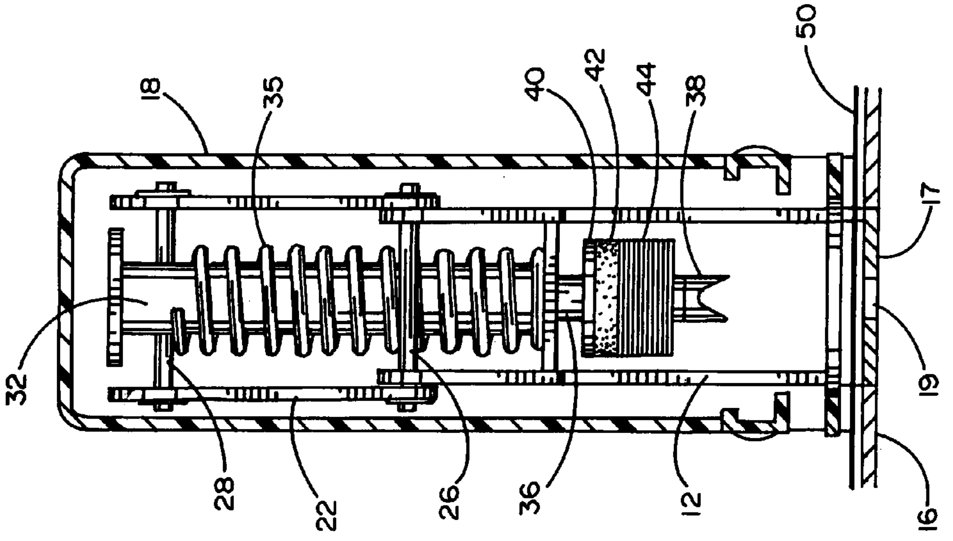
FIG. 4 is a partially cross-sectioned front view of the punch in a relaxed state.
Figure 7:
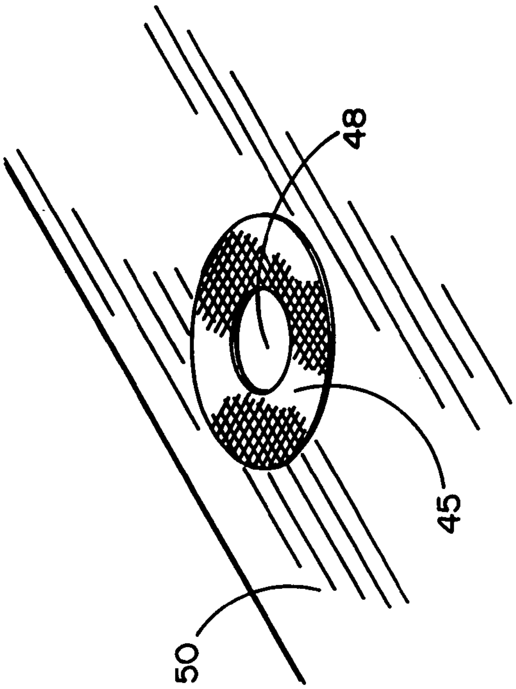
FIG. 7 shows the result of punch activation.
Figure 6:
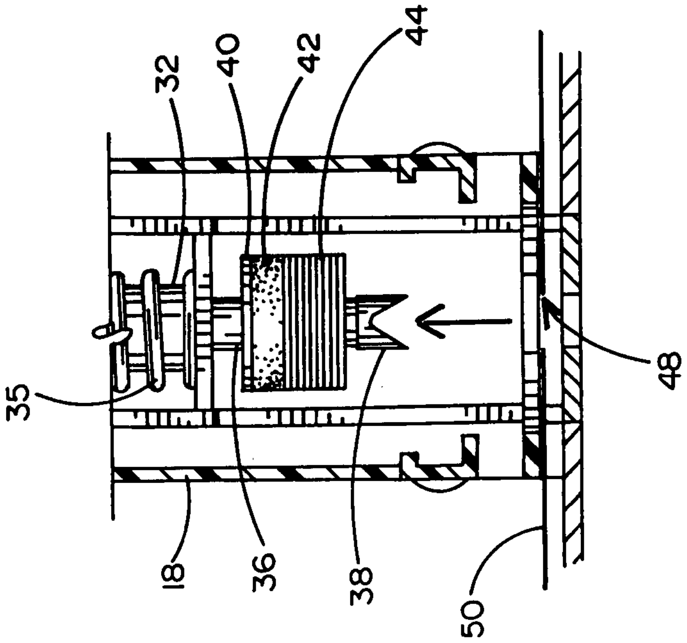
FIG. 6 is a partial front view showing the released punch just after being activated.

As shown in FIG. 5, when the shaft 36 is forced toward base 16, the face 38 first punctures a sheet 50 to create a chad 46, which is collected within the base 16. As the shaft 36 proceeds further, the face 38 passes through aperture 19 until the lowermost reinforcement ring 45 of ring stack 44 is compressed against sheet 50 in precise axial alignment with the newly created punctured hole 48 (See FIG. 7). Adhesive on the lowermost ring 45 causes it to adhere to the sheet 50, which pulls the ring away from the rest of the ring stack 44. Upon release of handle 14, spring 35 expands to its nominal extension pushing upwardly on punch pin 28 and raising shaft 36 with stack 44 as shown in FIG. 6. It will be observed that except for compression disk 40, cushion 42 and ring stack 44, the configuration and operation of hole punch 10 is relatively conventional.

Other unique aspects of the illustrated embodiment are found in the configuration of enclosure 18, the manner in which a sheet 50 is retained close to base 16 to pull the lowermost ring 45 away from stack 44 and the manner in which a new ring stack 44 is installed on shaft 36. These novel features of the present invention are illustrated in FIGS. 8-12 to which reference will now be made.

Figure 8:
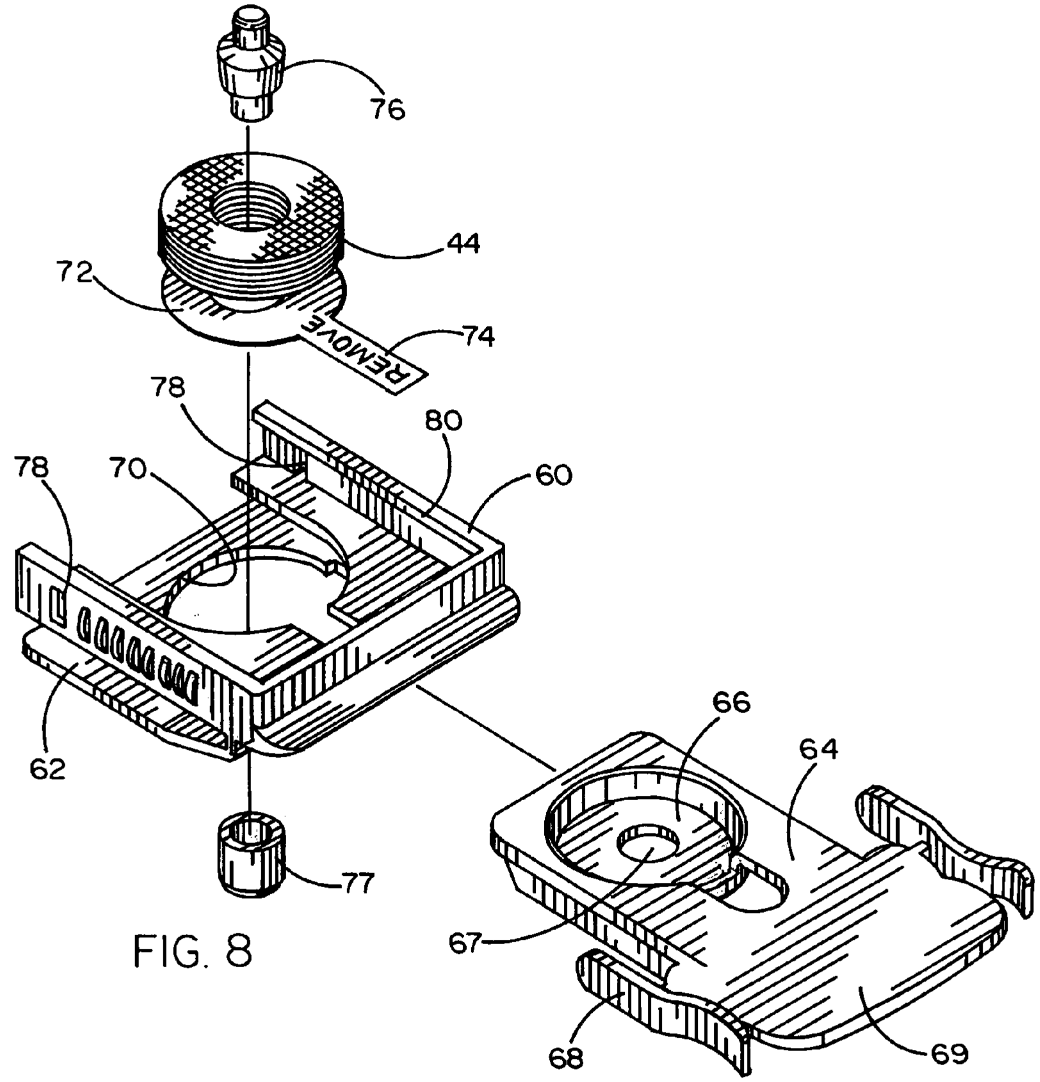
FIG. 8 is an exploded view of a sheet interface unit and ring stack cassette.
Figure 9:
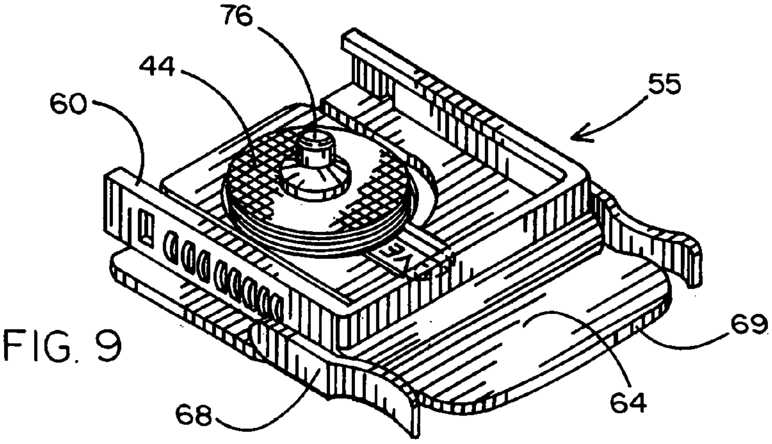
FIG. 9 is an assembled view of the sheet interface unit and ring stack cassette of FIG. 8.
Figure 10:
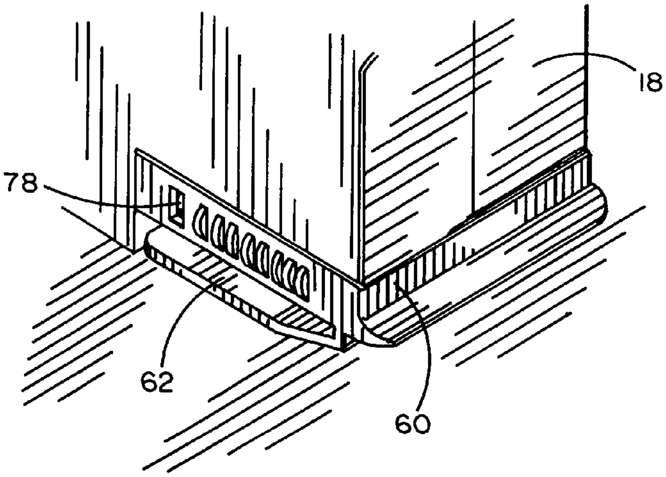
FIG. 10 is a three-dimensional view of the sheet interface unit installed in the punch enclosure.
Figure 11:
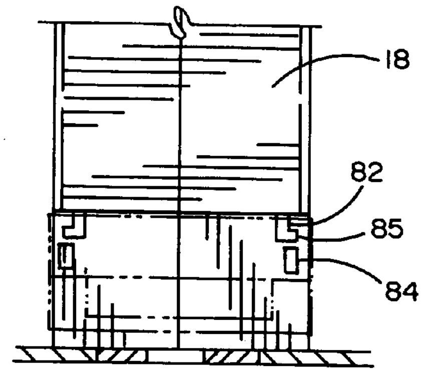
FIG. 11 is a partially phantom front view of the installation of FIG. 10.
Figure 12:
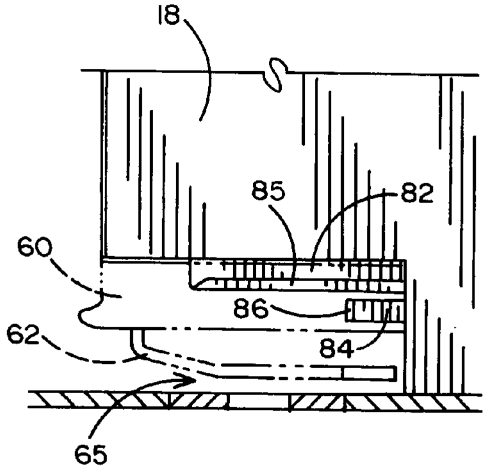
FIG. 12 is a partially phantom side view of the installation of FIG. 10.
Figure 13A:
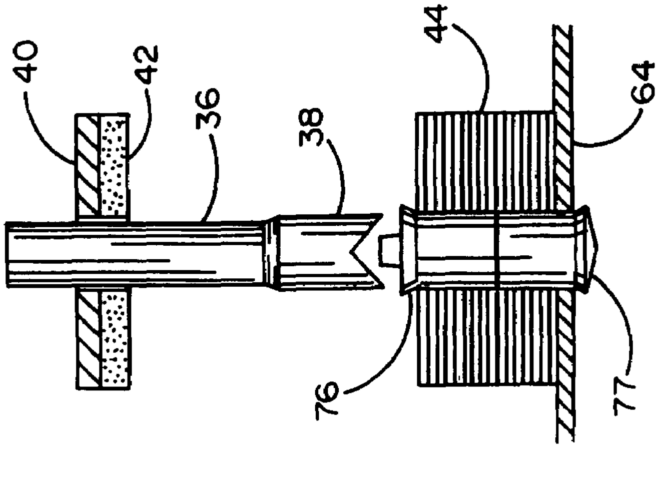
FIGS. 13A, 13B, 13C, 14, 15A, 15B and 15C illustrate installation of a new ring stack and operation thereafter.
Figure 13B:
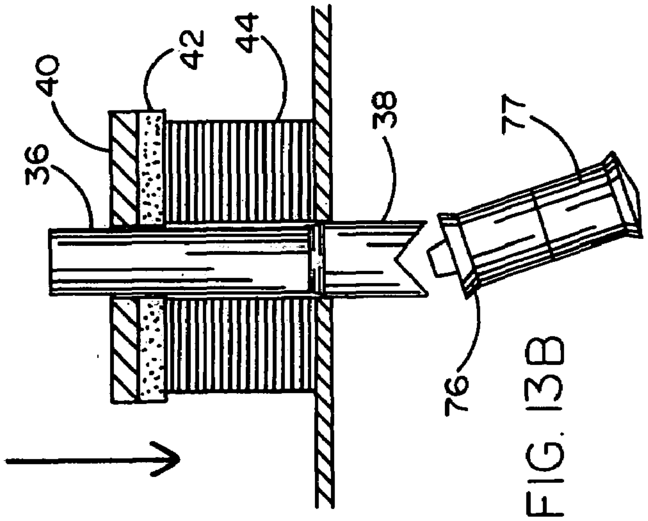
Figure 13C:
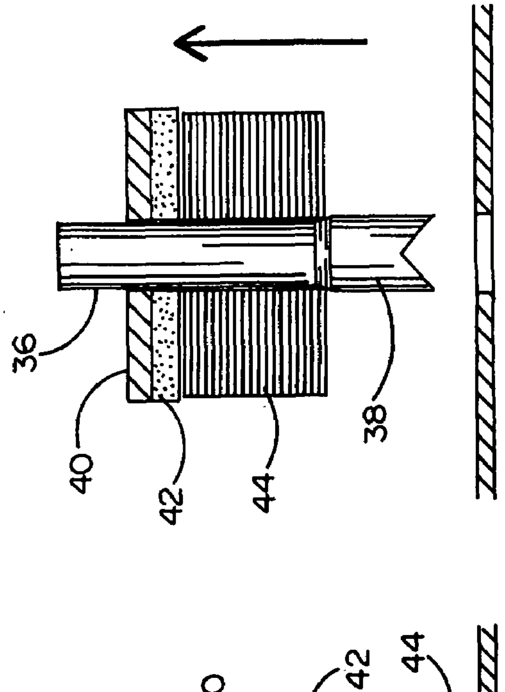
Figure 14:
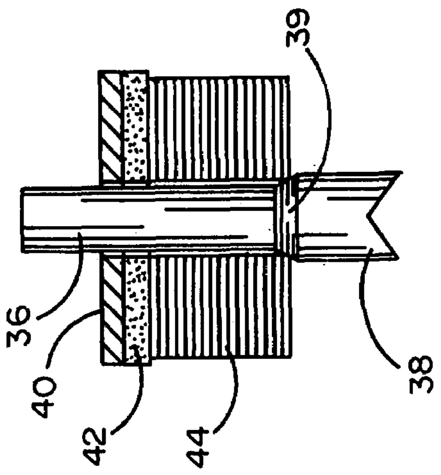
Figure 15A:
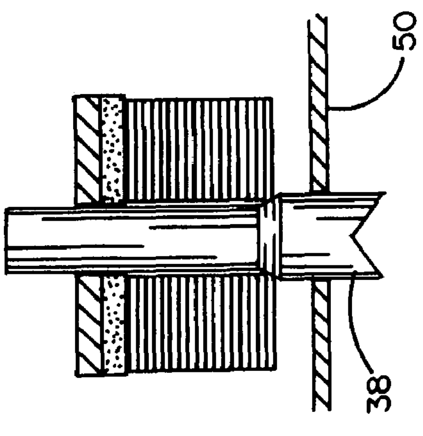
Figure 15B:
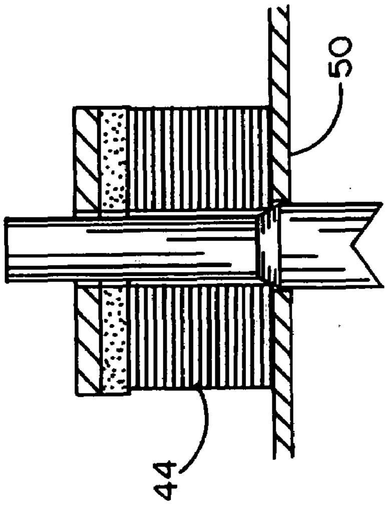
Figure 15C:
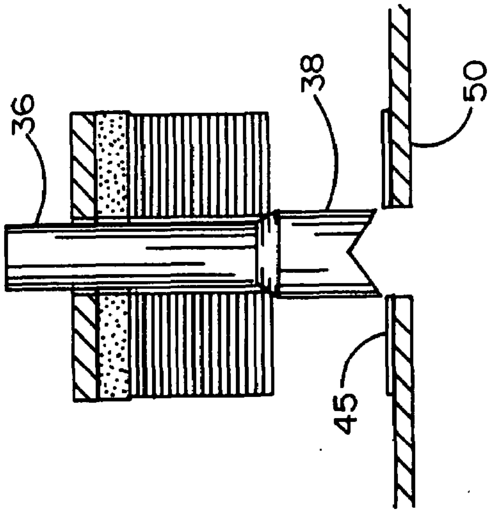

As seen in FIGS. 8 and 9, a new or replacement ring stack 44 is provided in a dual unit, preferably plastic assembly 55 comprising a sheet interface unit 60 and a ring stack cassette 64. Unit 60 has a cantilevered sheet retainer 62 seen in phantom side view in FIG. 12. It also has a well hole 70, and a pair of lock receptacles 78 in respective interface rails 80. Unit 64 has a stack well 66 with a central aperture 67, a pair of opposed flex tabs 68 and a handle 69. The replacement stack 44 is positioned well 66 above well hole 70 and is stabilized on a frangible axle formed by upper axle member 76 and lower axle member 77. A protection device 72 has a pull-tab 74 and is positioned below the stack 44 to the lowermost ring adhesive from attracting dust. It is removed before stack installation. The combined assembly 55 is provided as a ready to install dual unit shown in FIG. 9. After installation into enclosure 18, the ring stack cassette 64 is removed and discarded and the sheet interface unit 60 remains on the bottom of enclosure 18 as shown in FIGS. 10-12. FIG. 10 shows the installed unit 60 at the bottom of enclosure 18. It mates with enclosure rail 82, which receives interface rail 80 on rail flange 85. Unit 60 is nominally locked in place on enclosure 18 by a pair of lock's 86, which are received in lock receptacles 78 of each rail 80 on unit 60. As seen in FIG. 12, sheet retainer 62 rests just above bracket base 17 and aperture 19 where it forms a gap 65. Gap 65 is sufficiently high to receive a sheet 50, but is sufficiently small to prevent sheet 50 from rising significantly above bracket base 17. In this way, the sheet 50 will contact sheet retainer 62 where it will stop and thereby pull away the lowermost adhered reinforcement ring 45 from stack 44 as the shaft 36 is withdrawn from the sheet.

FIGS. 13A, 13B, 13C, 14, 15A, 15B and 15C illustrate the operation of the invention.

It will now be understood that what has been disclosed herein is a hole punch which has the additional feature of automatic reinforcement ring placement in precise axial alignment with the punched hole. By employing a sheet retainer, a single reinforcement ring is adhered to the sheet, which then pulls the unitary ring away from the remaining stack of rings. Various modifications may be made to the disclosed embodiment without deviating from the spirit and scope of the invention. By way of example, while a two-hole punch has been illustrated, it will be readily apparent that the inventive features hereof may be employed in one-hole and three-hole punches as well as any other number of hole punches in a similar arrangement. Therefore, the scope hereof is to be limited only by the appended claims and their equivalents.

I claim:

1. A hole punch apparatus having at least one stack of reinforcement rings for placement of one such ring around each punched hole during creation of the punched hole, the apparatus comprising:

a punch shaft terminating in a sharp-edge punch face for generating a hole by piercing a sheet of paper in response to an applied force to move said shaft into compressive engagement with said sheet;

a compression disk affixed to said shaft at a location displaced from said punch face, said stack of reinforcement rings being positioned on said shaft between said compression disk and said punch face, the lowermost reinforcement ring of said stack being forced into compressive engagement with said sheet around said hole by a force applied by said compression disk to said stack after said punch face has penetrated said sheet and traveled through said hole;

each said reinforcement ring in said stack having an adhesive coating on a surface that directly engages said sheet for adhering to said sheet upon withdrawal of said punch shaft;

further comprising a replacement ring stack mounted on a frangible axle in a cassette device having an annular well for receiving said stack;

wherein said cassette is configured for placement beneath said punch face with said frangible axle aligned with said punch shaft for automatic removal of said axle and mounting of said replacement ring stack onto said punch shaft by activation of said apparatus.

2. In a hole punch apparatus having a punch shaft terminating in a sharp-edge punch face for generating a hole by piercing a sheet of paper in response to an applied force to move the shaft into compressive engagement with the sheet; a reinforcement ring placement device for placement of a reinforcing ring around each punched hole during creation of such a hole; the device comprising:

a compression disk affixed to said shaft at a location displaced from said punch face;

a stack of reinforcement rings positioned on said shaft between said compression disk and said punch face, a lowermost ring of said ring stack being forced into compressive engagement with said sheet around said hole by a force applied by said compression disk to said stack after said punch face has penetrated said sheet and traveled through said hole;

each said reinforcement ring in said stack having an adhesive coating on a surface that directly engages said sheet for adhering to said sheet upon withdrawal of said punch shaft;

further comprising a replacement ring stack mounted on a frangible axle in a cassette device having an annular well for receiving said stack;

wherein said cassette is configured for placement beneath said punch face with said frangible axle aligned with said punch shaft for automatic removal of said axle and mounting of said replacement ring stack onto said punch shaft by activation of said apparatus.

* * * * *